United States Patent [19]

Wilcox

[11] 4,167,751
[45] Sep. 11, 1979

[54] CURRENT MATRIX FOR ENCODING TELEVISION VIDEO SIGNALS

[75] Inventor: Milton E. Wilcox, San Jose, Calif.

[73] Assignee: National Semiconductor Corporation, Santa Clara, Calif.

[21] Appl. No.: 914,316

[22] Filed: Jun. 12, 1978

[51] Int. Cl.² .............................................. H04N 9/52
[52] U.S. Cl. .................................................... 358/30
[58] Field of Search ......................................... 358/30

Primary Examiner—George G. Stellar
Attorney, Agent, or Firm—Gail W. Woodward

[57] ABSTRACT

Color television video signals are first converted into current analogs and then processed to provide the luminance and chrominance values required by the NISC or PAL standards. By using the current mode fewer critical parts are needed and the circuits are amendable to integrated circuit construction.

10 Claims, 5 Drawing Figures

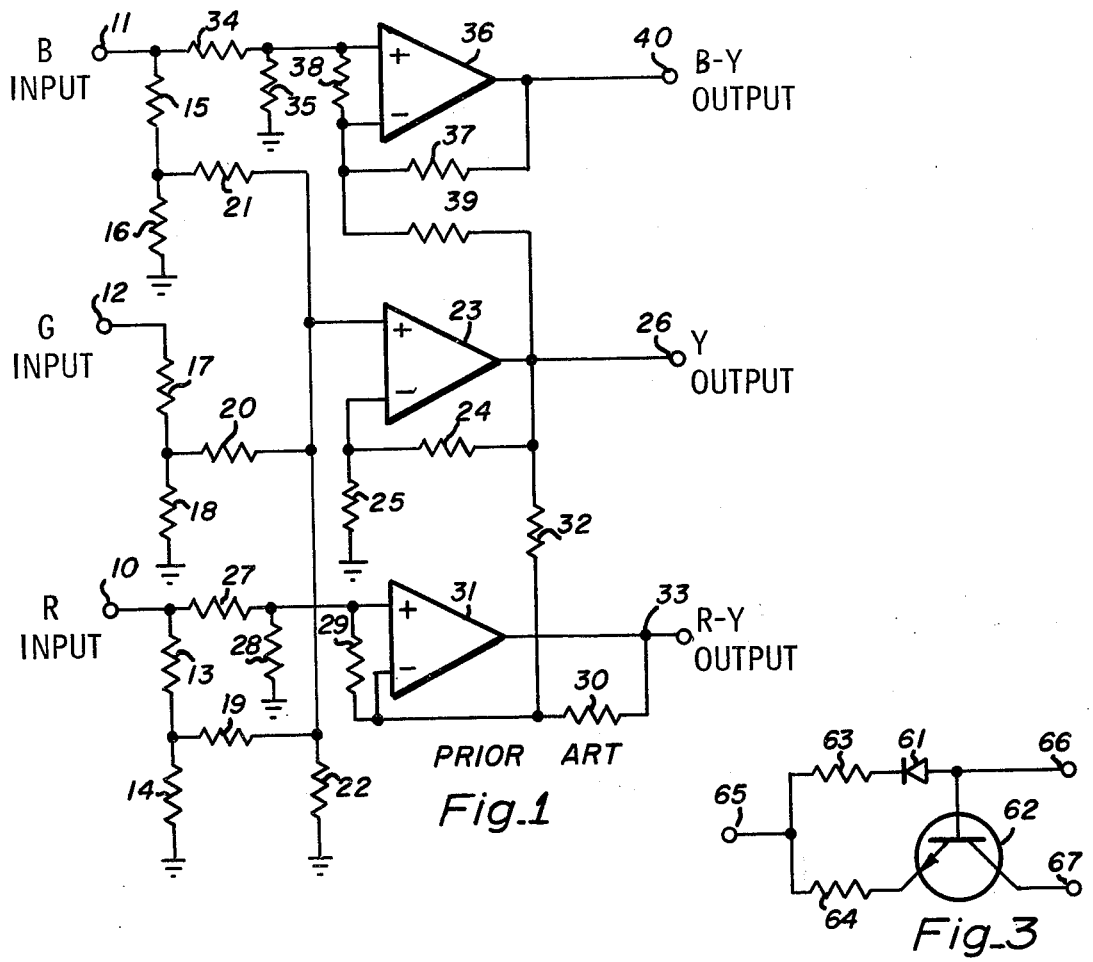
Fig. 1 (PRIOR ART)
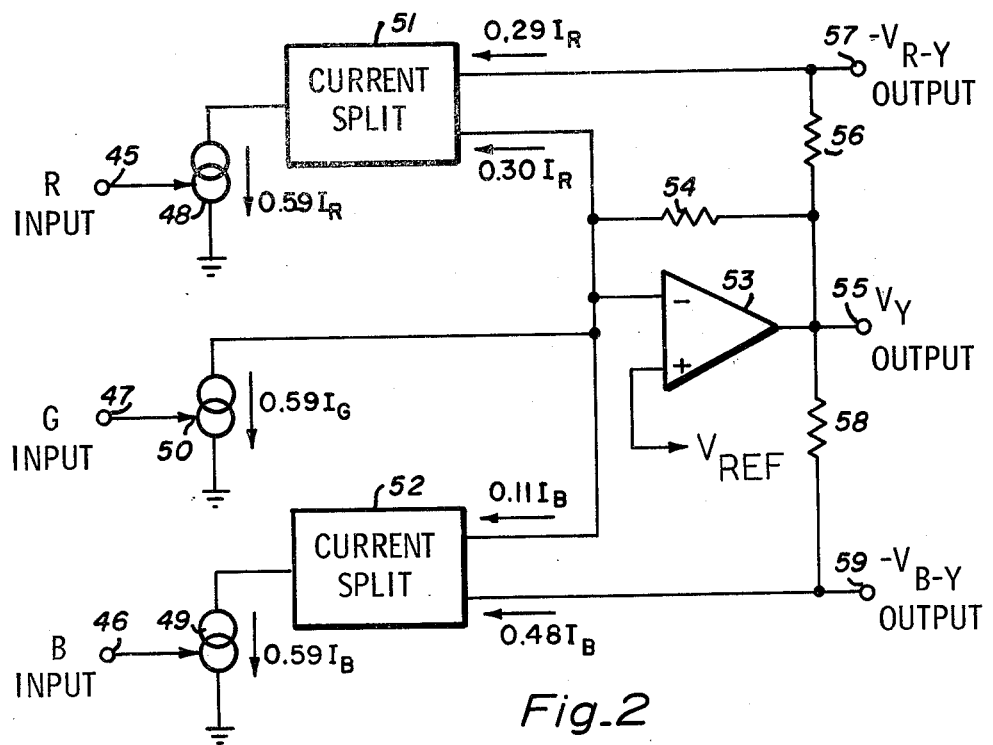
Fig. 3
Fig. 2

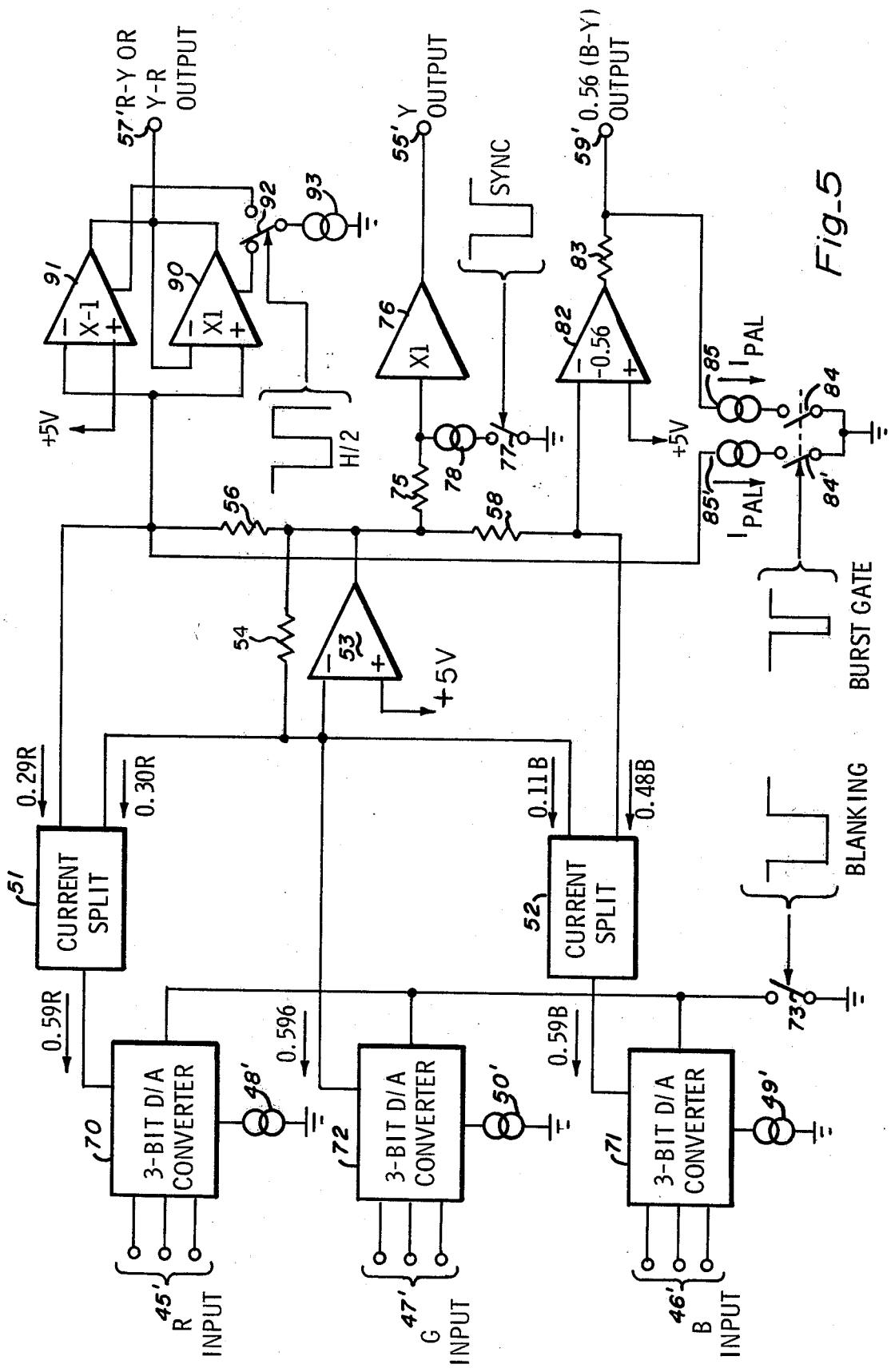
Fig_5

CURRENT MATRIX FOR ENCODING TELEVISION VIDEO SIGNALS

BACKGROUND OF THE INVENTION

Color television systems operate on the additive primary colors red, blue, and green. Tricolor cameras produce signals that represent a scene being viewed in terms of three color-related analog voltages. In order to make color television compatible with monochrome television, a conventional luminance signal is transmitted on a carrier while separate color information is multiplexed onto the carrier for use by color receivers. The luminance signal is obtained by combining the three primary color signals in proportions that take into account the luminosity response of the eye. The actual values were set by the National Television Standards Committee (NTSC) which the later adopted Federal Communications Commission rules specify. The rules specify a luminance signal made up of 59% of the green voltage, 30% of the red voltage, and 11% of the blue voltage (0.59G+0.30R+0.11B). Two color difference signals are specified as the red minus luminance (R−Y) and blue minus luminance (B−Y). The color signals, therefore, are:

$$R-Y = 0.70R - 0.59G - 0.11B \quad (1)$$

$$B-Y = 0.89B - 0.59G - 0.30R \quad (2)$$

$$Y = 0.59G + 0.30R + 0.11B \quad (3)$$

These color signals are typically matrixed and applied to color subcarrier modulators to be multiplexed with the luminance signal ordinarily transmitted over the television channel.

The conventional way of obtaining the luminance and color difference signals, from the basic red, blue, and green signals, usually involves a matrix circuit having multiple resistor voltage dividers and summing amplifiers. This approach is complicated in that many resistors must be matched and a plurality of amplifiers must be employed. The requirements are difficult to meet in integrated circuit (IC) designs.

SUMMARY OF THE INVENTION

It is an object of the invention to provide an efficient current matrix for converting color signals into luminance and color difference signals.

It is a further object of the invention to employ the current mode in an integrated circuit that will efficiently convert red, green, and blue color signals into luminance and color difference signals.

These and other objects are achieved in the following IC configuration. The three color signals R, G, and B are converted into analog current values. The R and B currents are passed through current splitters which produce pairs of currents in predetermined ratios. The ratios are set so that a first red current combined with a first blue current and the green current produce the NTSC luminance signal. A summing amplifier converts the combined currents into a luminance voltage $V_Y$. The remainders of the red and blue currents are converted into related voltages and combined with $V_Y$ to produce $V_{R-Y}$ and $V_{B-Y}$.

In the case where the color signals are in the form of digital equivalents, they are first passed through digital-to-analog (D/A) converters (DACs). These DACs can be implemented to provide analog output currents that are matrixed as described.

The input currents can be suppressed if desired during the television blanking intervals and the luminance signal can be modulated with sync information during the blanking interval. In addition, color burst information can be applied to modulate the matrixed signal.

In addition to the above described NTSC signal production, the current matrix can easily be employed in the generation of phase alternating line (PAL) color standards employed abroad.

BRIEF DESCRIPTION OF THE DRAWING

FIG. 1 is a diagram of the typical prior art matrix;

FIG. 2 is a simplified diagram of the circuit of the invention;

FIG. 3 is a schematic diagram of the currrent split circuit of FIG. 2;

FIG. 5 is a diagram of a PAL system using the invention.

DESCRIPTION OF THE PRIOR ART

Figure 4:
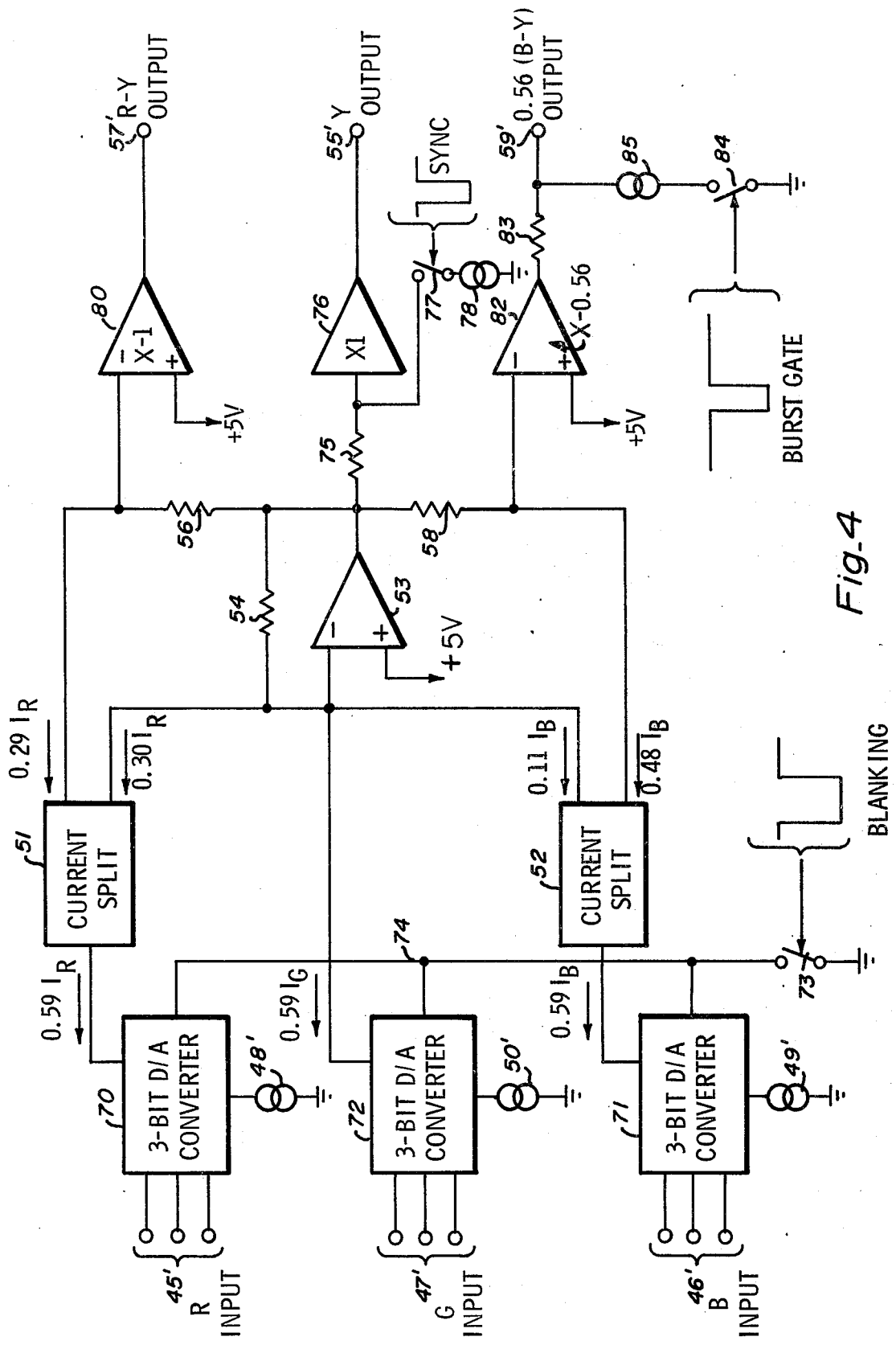
FIG. 4 is a diagram of an NTSC system using the invention.

In FIG. 1, the three inputs R, B and G analog signal voltages are applied to terminals 10, 11, and 12, respectively, with respect to ground. Resistors 13 and 14 divide the R signal, resistors 15 and 16 divide the B signal, and resistors 17 and 18 divide the G signal. Resistors 19, 20, 21, and 22 couple the divided signals in common to the input of differential op amp 23. Resistors 24 and 25 set the gain of op amp 23. The luminance, or Y, signal appears at output terminal 26.

Resistors 27 and 28 apply a fraction of the R input to op amp 31. Resistors 29 and 30 (in large measure) set the gain of op amp 31 and resistor 32 feeds a portion of the Y signal to the inverting input of op amp 31. R−Y therefore appears at output terminal 33.

Resistors 34 and 35 feed a portion of the B signal to op amp 36. Resistors 37 and 38 (in large measure) set the gain of op amp 36, and resistor 39 couples a portion of the Y signal to the inverting input of op amp 36. Thus, the B−Y signal appears at output terminal 40.

By the proper selection of the resistor values the NTSC signal relationships can be achieved. The following chart lists a suitable combination of values.

| RESISTOR | VALUE (k ohms) |
| --- | --- |
| 13 | 7.5 |
| 14 | 3.3 |
| 15 | 9.1 |
| 16 | 1.0 |
| 17 | 3.9 |
| 18 | 5.6 |
| 19 thru 21 | 100 |
| 22 | 51 |
| 24 | 100 |
| 25 | 50 |
| 27 | 100 |
| 28 | 75 |
| 29 | 15 |
| 30 | 75 |
| 32 & 34 | 100 |
| 35 & 37 | 50 |
| 38 | 22 |
| 39 | 100 |

The op amps 23, 31, and 36 can be of the LM349 variety which is a quad op amp available from National Semiconductor Corporation and others.

As can be seen, the numerous resistor values must be precise or at least ratioed and this presents a serious problem, particularly when it is desired to produce the circuit in IC form. Furthermore, many of the resistor values interact with others in determining signal values.

DESCRIPTION OF THE INVENTION

The basic concept of the invention is illustrated in FIG. 2. The R, B, and G analog signal inputs, applied to terminals 45–47 respectively, are coupled to current generators 48–50 respectively. Thus, the input voltage analog is converted to the current analog. Generator 48 is shown producing a current of 0.59 $I_R$, generator 49 produces 0.59 $I_B$, and generator 50 produces 0.59 $I_G$. These numbers are arbitrary. The value 0.59 was merely to illustrate the NTSC relative values. Current split 51 divides 0.59 $I_R$ into two components, 0.30 $I_R$, and 0.29 $I_R$. Current split 52 divides 0.59 $I_B$ into 0.11 $I_B$ and 0.48 $I_B$. Three currents consisting of 0.59 $I_G$, 0.30 $I_R$, and 0.11 $I_B$ are summed in op amp 53. Resistor 54 is connected between the output and inverting input terminals of op amp 53. The non-inverting input is coupled to a source of reference voltage. Thus, resistor 54 is a current summing resistor for the three input currents and the output voltage at terminal 55 will be $V_Y$ luminance in accordance with the NTSC standard of equation (3). The 0.29 $I_R$ current from split 51 is passed through resistor 56 which is made equal to the value of resistor 54 divided by 0.29. This produces a signal at terminal 57 of $-V_{R-Y}$. The 0.48 $I_B$ current from split 52 is passed through resistor 58 which is made equal to the value of resistor 54 divided by 0.48. Thus, the signal $-V_{B-Y}$ appears at terminal 59. If simple unity gain inverters are coupled to terminals 57 and 59, the three outputs $V_Y$, $V_{R-Y}$, and $V_{B-Y}$ would be available.

FIG. 3 illustrates the nature of the current split circuits 51 and 52 of FIG. 2. Two resistors, a diode, and a transistor are employed. In IC form diode 61 would probably be a diode connected transistor desirably having an emitter with area rationed to the area of the emitter of transistor 62. This is a conventional current mirror with resistors 63 and 64 acting to radio the mirrored currents. Thus, the current at terminal 64 will be the sum of the currents at terminals 66 and 67. The terminal 66 current will be:

$$I_{66} = I_{65}(R_{64}/R_{63}+R_{64}) \quad (4)$$

and the current at terminal 67 will be:

$$I_{67} = I_{65}(R_{63}/R_{63}+R_{64}) \quad (5)$$

where: the currents relate to the indicated terminals and the resistor values relate to the ohmic value of the numbered resistors.

From the above it can be seen that ratioing the current split resistors will provide the required current ratioing. Controlling resistors 56 and 58 with respect to resistor 54 will provide the proper output voltage ratios. Clearly, the circuit of FIG. 2 is much easier to implement than the circuit of FIG. 1.

FIG. 4 shows how the circuit of the invention is implemented in a typical system. Where elements have a counterpart in FIG. 2 similar numbers are used. Current generators 48', 49', and 50' are not modulated directly but are coupled to D/A converters 70–72. This arrangement is to show that a digital color television system is contemplated. Each primary color is encoded into three bit digital signals. D/A converter 70 will act to modulate current source in accordance with the digital red inputs 45'. Similarly D/A converters 71 and 72 modulate current sources 49' and 50' respectively in response to the digital blue signals at 46' and green signals at 47' respectively. D/A converters 70–72 are modulated by a switch 73 to accomplish blanking. When line 74 is low, the signals are interrupted and blanking is achieved.

The luminance signal is summed in resistor 54 by the action of op amp 53 and coupled through resistor 75 and buffer 76 to Y output terminal 55'. Switch 77 when closed applies a synchronizing pulse from source 78 to buffer 76. This occurs during the blanking interval and is present to achieve the NTSC composite video modulation. In order to convert the Y–R signal developed at resistor 56, unity gain inveter 80 produces an R–Y output at terminal 57'. Similarly, the Y–B signal available at resistor 58 is processed by 0.56 gain inverter 82 to produce a 0.56 (B–Y) signal at output terminal 59'. Isolation resistor 83 permits the periodic coupling by switch 84 of a color burst gate current source 85 to terminal 59'. This burst gate is coupled between the trailing edge of the synchronizing pulse at switch 77 and the trailing edge of the blanking pulse at switch 73. Thus, the circuit of FIG. 4 is capable of generating the NTSC signals from RBG digital color signals.

FIG. 5 is similar to FIG. 4 and similar parts bear the same numbers. However, instead of NTSC, the circuit is designed to produce the PAL signals. This circuit is largely like that of FIG. 4 from the inputs through to Y terminal 55' and to 0.56 (B–Y) terminal 59'. However, an additional burst gate switch 84' applies a color burst gate current 85' to the Y–R signal on resistor 56. Thus, both chrominance channels contain color subcarrier burst pulses. The main difference is in how the Y–R signal is processed. Resistor 56 feeds two unity gain devices, a unity gain buffer 90 and a unity gain inverter 91. An SPDT switch 92 alternately connects current source 93 to devices 90 and 91. Switch 92 is operated at half of the horizontal line rate. This means that the signal at terminal 57' alternates from R–Y to Y–R on successive horizontal lines to provide the PAL signal requirements.

The invention has been described and its relationship to existing color television systems shown. Clearly, there are alternatives and equivalents that are within the spirit and intent of the invention. Accordingly, it is intended that the scope of the invention be limited only by the following claims.

I claim:

1. A color television circuit for converting red, green, and blue color signal components into a luminance component and color difference components which represent the red component less the luminance component and the blue component less the luminance component, said circuit comprising;

means for converting said red, blue, and green signal components into proportional current analog values;

means for splitting said red current analog into a first red current and a second red current;

means for splitting said blue current analog into a first blue current and a second blue current;

means for summing said green current with said first red current and said first blue current and for converting said sum into an equivalent luminance analog voltage;

means for converting said second red current into an equivalent red analog voltage and for combining said red analog voltage with said luminance analog voltage to produce a red difference component; and means for converting said second blue current into an equivalent blue analog voltage and for combining said blue analog voltage with said luminance analog voltage to produce said blue difference component.

2. The circuit of claim 1 wherein said means for splitting each comprise a current mirror.

3. The circuit of claim 2 wherein said current mirror includes current ratioing resistors the values of which establish the split current ratio.

4. The circuit of claim 1 wherein said red, blue, and green signal components are in digital form and said means for converting said red, blue, and green signal components comprise digital to analog converter means.

5. The circuit of claim 4 further comprising signal current source means modulated by said digital to analog converter means.

6. The circuit of claim 5 further comprising blanking signal means coupled to said digital to analog converter means.

7. The circuit of claim 6 further comprising synchronizing pulse means coupled to modulate said equivalent luminance analog voltage.

8. The circuit of claim 7 further comprising burst gate means coupled to modulate said blue difference component.

9. The circuit of claim 7 further comprising burst gate means coupled to modulate said blue difference and said red difference components.

10. The circuit of claim 9 further comprising means for periodically reversing the polarity of said red difference component.

* * * * *